J. CROMWELL.
COFFEE-POT.
No. 185,503.  Patented Dec. 19, 1876.
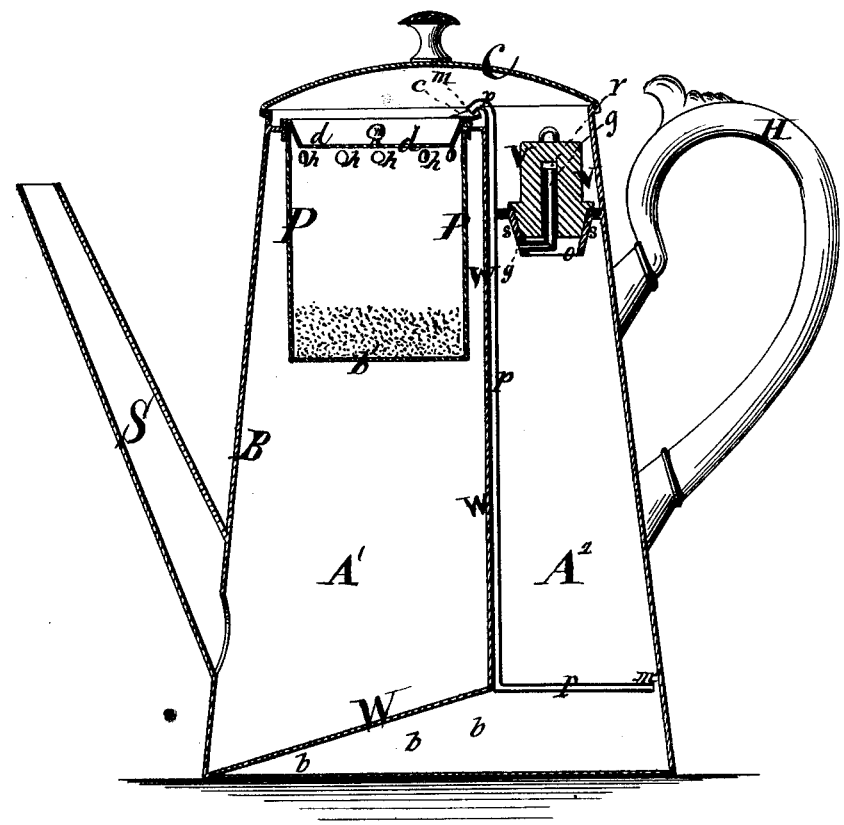
Witnesses:
Michael Ryan
Fred Haynes
John Cromwell
by his Attorneys
Brown & Allen

UNITED STATES PATENT OFFICE.

JOHN CROMWELL, OF CRANFORD, NEW JERSEY.

IMPROVEMENT IN COFFEE-POTS.

Specification forming part of Letters Patent No. 185,503, dated December 19, 1876; application filed February 9, 1876.

*To all whom it may concern:*

Be it known that I, JOHN CROMWELL, of Cranford, in the county of Union and State of New Jersey, have invented a new and useful Improvement in Coffee and Tea Pots; and I do hereby declare that the following is a full, clear, and exact description of the same, reference being had to the accompanying drawing, which forms part of this specification.

Although my invention relates, primarily, to coffee and tea pots, it may be applied to vessels for making decoctions or infusions of other vegetable substances.

The invention consists of a combination, in a pot or vessel, of two chambers, one of which contains a percolator, the other chamber being a boiler, which, by pressure of steam generated therein, discharges a stream of boiling water upon the contents of the percolator in the first-named chamber, the boiling water being forced through a suitable pipe, acting in combination with the chambers by the pressure of the steam. It also consists in a tubular valve-guide, which guides the valve that closes the chamber in which the extracting liquid is boiled, and also acts as a vent when said chamber is being filled with such liquid.

The drawing represents a central vertical section of my improved coffee or tea pot.

B is the body of the pot, provided with handle H, spout S, and cover C, in the usual manner. By a bent partition, W, the interior of the pot is divided into the chambers $A^1$ and $A^2$. The chamber $A^2$ is closed at the top by the valve-seat $s$ and the valve V, which valve is of solid metal, as shown, or otherwise weighted sufficiently to require a pressure above that of the atmosphere within the said chamber $A^2$ to raise the said valve, said excess of pressure above that of the atmosphere being also sufficient to force a column of liquid up through the pipe $p$, which leads from near the bottom of the said chamber $A^2$ up through the valve-seat $s$, and discharges into the top of the chamber $A^1$. The lower part of the partition W is bent, so as to form a bottom for the chamber $A^1$, the said chamber $A^1$ being thus provided with a water-bottom, $b$, which protects it from excessive heat before water from the chamber $A^2$ is discharged into it, and keeps the decoction sufficiently hot thereafter without boiling. In the upper part of the chamber $A^1$ is suspended, in any suitable manner, the percolator P, the bottom of which, $b'$, is reticulated. The said percolator P is removable from the chamber $A^1$ and from the pot. At the top of said percolator is, preferably, placed a removable distributer, $d$, being a shallow pan with reticulated bottom, which breaks up the stream of boiling water issuing from the upper mouth $m$ of the pipe $p$, and causes the water to filter more uniformly through the contents of the percolator P. The said distributer $d$ may have formed upon it a small chute, $c$, to assist in the spreading and breaking up the stream of boiling water issuing from the mouth $m$ of the pipe $p$. Access to the interior of the chamber $A^2$, for filling it with water or other liquid, is had through the opening $o$ in the valve-seat $s$ when the weighted valve V is removed. The tubular valve-guide $g$, opening into the chamber $A^2$, acts as a vent for the escape of air while said chamber is filling, and also as a guide for the said valve, the upper part of the said valve-guide $g$ passing into a recess, $r$, formed in the said valve, in such a manner as to direct the said valve to its proper position on and in the valve-seat $s$. When the loaded valve V is closed the chambers $A^1$ and $A^2$ have no communication with each other, except through the pipe $p$, and if the pipe $p$ be made small enough, the water in the boiling-chamber will be at all times subjected to a steam-pressure, which renders the forcing of the water through the pipe $p$ forcible and positive without danger of bursting the said boiling-chamber. This is a feature not possessed by other coffee-pots known to me, in which water is forced through a pipe from a boiling-chamber into a receiving-chamber.

In operation, the coffee or other substance to be decocted or infused is placed in the percolator P in the chamber $A^1$, and the distributer $d$ placed on the top of the percolator P, as hereinbefore described. Water is placed in the chamber $A^2$, and the weighted valve V is placed upon its seat. Heat is then applied to the bottom of the pot. Steam under more than atmospheric pressure is generated in the chamber $A^2$, which forces boiling water up through the pipe $p$, and through the mouth $m$ into the distributer $d$, whence the said liquid percolates down through the contents of the percolator P, extracting the soluble portions of the said contents. The vapors of ingredients more volatile than others enter the holes $h$ in the upper part of the percolator P, and are there redissolved by the clear liquid, and conducted back into the chamber $A^1$.

The transfer of liquid from the chamber $A^2$ to the chamber $A^1$ continues till the level of the liquid in the chamber $A^2$ falls below the lower mouth $m'$ of the pipe $p$ in the chamber $A^2$. Steam then, blowing through the upper mouth $m$, announces by its rushing sound or whistle that the process is completed.

I claim—

1. The combination of the boiling-chamber $A^2$ and the receiving-chamber $A^1$ with the valve-seat $s$, the loaded valve V, and the pipe $p$, substantially as and for the purpose described.

2. The combination of the tubular valve-guide and vent $g$, opening into the boiling-chamber $A^2$, the valve-seat $s$, and the valve V, substantially as and for the purpose specified.

JOHN CROMWELL.

Witnesses:
    FRED. HAYNES,
    E. B. SPERRY.